Jan. 3, 1956  H. W. JONES  2,729,496
AUTOMATIC HOOKS
Filed Sept. 15, 1952  2 Sheets-Sheet 1

INVENTOR
Harry W. Jones
BY
ATTORNEYS

Jan. 3, 1956 H. W. JONES 2,729,496
AUTOMATIC HOOKS
Filed Sept. 15, 1952 2 Sheets-Sheet 2
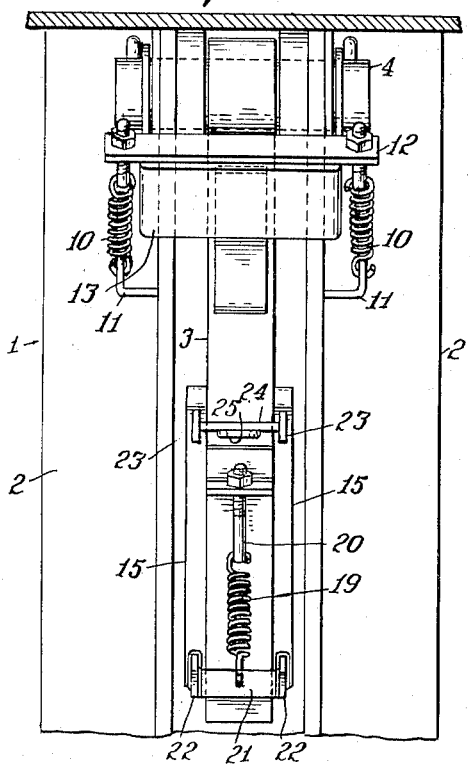
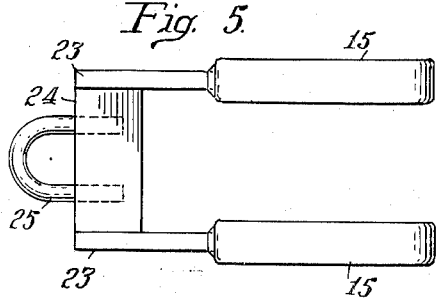
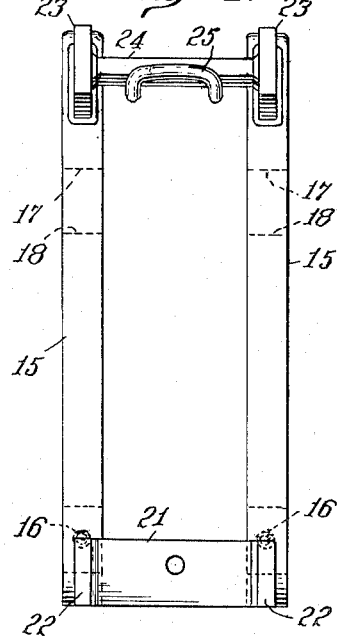
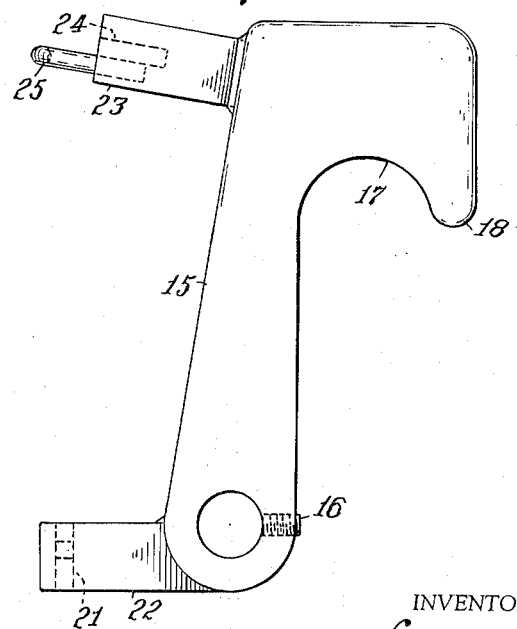
INVENTOR
Harry W. Jones
BY
ATTORNEYS

United States Patent Office 2,729,496
Patented Jan. 3, 1956

2,729,496

AUTOMATIC HOOKS

Harry W. Jones, Knoxville, Tenn., assignor to Dempster Brothers, Inc., Knoxville, Tenn., a corporation of Tennessee Application September 15, 1952, Serial No. 309,625

12 Claims. (Cl. 294—83)

This invention relates to improvements in automatic hooks, particularly of the type employed in transporting and dumping equipment, such as disclosed in the patents of George R. Dempster, No. 2,369,722, February 20, 1945, and No. 2,404,830, July 30, 1946.

In such transporting and dumping equipment a container is lifted by a hoisting unit onto a skid frame and is provided with a bail connected with the container for engagement with an automatic hook on the skid frame to facilitate dumping of the container either by tilting action or by lowering of a drop bottom door thereon. Frequently the containers are loaded improperly with the load centered toward one side or the other which causes a shifting of the container on the skid frame. At times the container may turn completely over because of a shifting of the load to the rear which would raise the bail out of the dumping hook. Frequently in dumping the tilt-type container, the bail raises vertically by an upward travel of the container on the skid frame. Such occurrences may cause disengagement of the container from the skid frame and the hook customarily provided thereon for holding the container in place which would interfere with the proper dumping of the container and the handling thereof on the unit.

One object of this invention is to overcome these objections by providing a safety catch which will insure the fastening of the bail in the hook until the catch is released and it is desired to disengage the container from the skid frame.

A further object of the invention is to improve the construction of the automatic hook of a hoisting and dumping unit by providing a safety catch thereon which will retain the container in the hook effectively not only during transportation, but also during dumping until release and removal thereof are desired.

Still another object of the invention is to provide a safety hook for an automatic dumping hook which is simple in construction and may be applied thereto and operated effectively to retain the container engaged within the automatic hook until release thereof is desired.

These objects may be accomplished according to one embodiment of this invention by the provision of a safety catch or hook which is mounted on the automatic hook of the hoisting unit in such relation thereto as to engage over the bail in the throat of the automatic hook and retain the bail in place therein effectively until the safety catch or hook is removed manually or by power. The safety catch is so connected with the automatic hook as to prevent the accidental disengagement of the container due to shifting of the load or container in handling or dumping until pulled out of place and disengaged when release thereof is accomplished.

This embodiment is illustrated in the accompanying drawings in which:

Fig. 3 is a side elevation from the side opposite that shown in Fig. 1;

Fig. 4 is an elevation of the safety hook or catch detached;

Fig. 5 is a top plan view thereof; and

Fig. 6 is a side elevation thereof.

Figure 1:
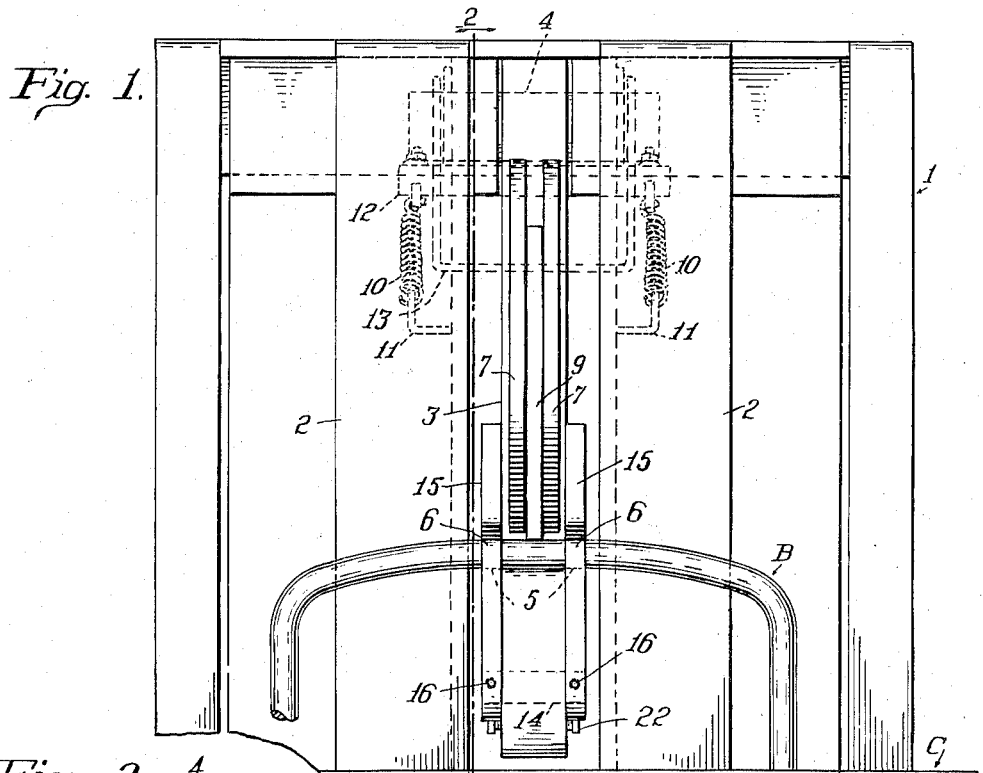
Fig. 1 is a front elevation of the improved automatic hook showing the invention applied thereto.

The invention is shown as applied to transporting and dumping equipment of the type which uses a skid frame mounted on a carriage such as that set forth in Patent No. 2,369,722, granted February 20, 1945. The carriage is designated generally by the numeral 1 and includes skid frame members 2 spaced apart and adapted to receive thereon a container C either of the tilt-type or of the drop bottom type which may be transported and dumped from the hoisting unit of the equipment. The container C is usually provided with a bail B to be engaged by an automatic hook on the carriage 1 to facilitate handling and dumping of the container.

In the form shown, the automatic hook comprises a body 3 in the form of an elongated member or casting pivotally supported by a pin 4 which extends transversely of the carriage 1 between spaced portions of the skid bars 2 in which the pin is secured. The lower end portion of the body 3 has a laterally projecting hook formed with a throat or seat 5 adapted to receive the bail B therein and an extended tip 6 on the opposite side of the throat 5 from the body 3, tending to retain the bail seated in the throat.

Figure 2:
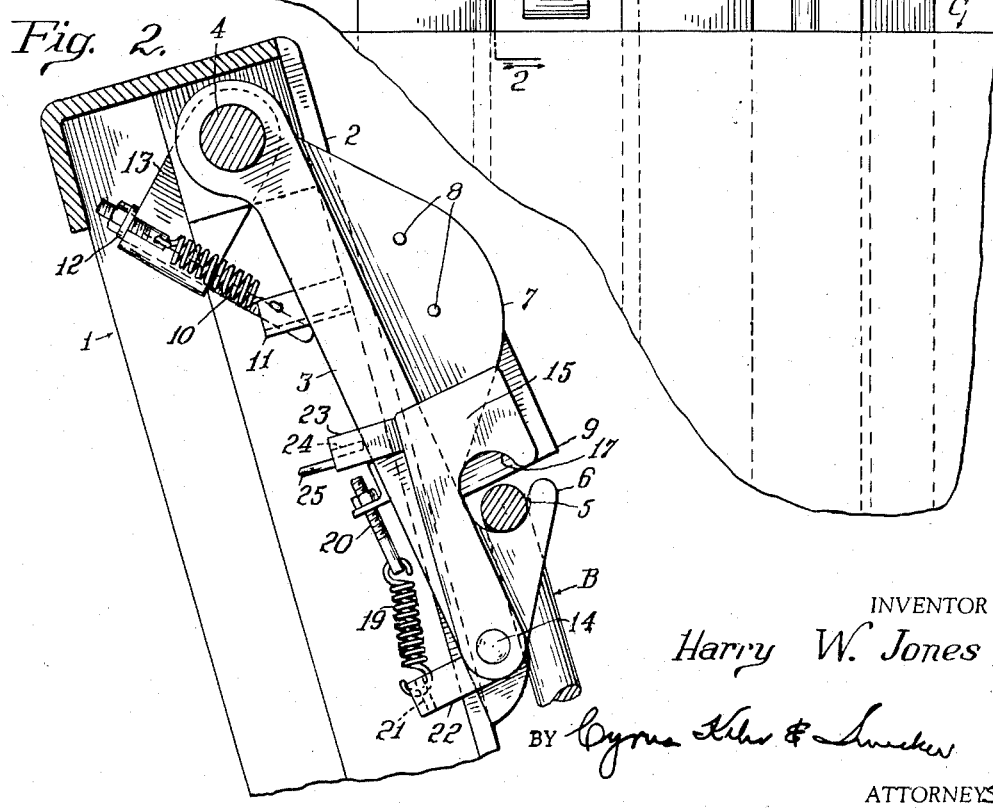
Fig. 2 is a vertical cross section therethrough on the line 2—2 in Fig. 1.

The body 3 is provided also with a pair of laterally spaced ribs 7, the outer surfaces of which are curved as shown in Fig. 2 to form cams especially at the top and bottom thereof to facilitate the discharge of the bail from the hook, as will be explained hereinafter. A pair of vertically spaced pins 8 are secured to the ribs 7 and extend therebetween, forming a guide for a shuttle member 9 that is slidably mounted on the pins 8 between the ribs 7 in position to engage the tip 6 of the hook to confine the bail B in the throat 5.

The automatic hook described above is substantially the same in construction and manner of operation as that set forth in the Dempster Patent No. 2,404,830, granted July 30, 1946.

The carriage 1 is usually inclined somewhat, as indicated in Fig. 2, and it is desired to turn the body 3 in such relation that the throat 5 and the tip 6 will be held normally projecting out of the plane of the front face of the skid bars 2 of the shuttle. This is provided by a pair of springs 10 anchored at one end of each to a bracket 11 on the carriage 1 and, at the opposite end of each, the springs 10 are connected with a cross bar 12 on a spring bracket 13. The spring bracket 13 is welded or otherwise secured rigidly to the cross pin 4 on which the hook body 3 is pivotally mounted and secured so as to rotate the pin 4 and cause swinging movement of the body 3 of the hook in response to the tension of the springs 10 acting on the bracket 13. Thus, swinging movement of the body 3 in a clockwise direction, as in Fig. 2, will stretch the springs 10 and cause the latter normally to return the hook body 3 in a counterclockwise direction, as viewed in Fig. 2, upon release of the turning force supplied thereto, thus normally tending to maintain the automatic hook in the position shown in Fig. 2.

At the lower end of the body 3 is a cross pin 14 extending transversely therethrough. A safety catch or safety hook is pivotally supported on the pin 14 for swinging movement relative to the body 3 to retain the bail B in the throat 5.

In the embodiment shown, this safety hook or safety catch comprises a unitary structure including a pair of side members 15 which are elongated vertically. The members 15 are secured rigidly at their lower ends on the pin 14 in embracing relation with the body 3, being spaced apart transversely. Set screws are shown at 16 for securing the members 15 on the pin 14.

The upper ends of the members 15 are formed with hook portions 17 that are turned downward in opposing relation with the hook portions 5—6 in the automatic hook so as to overlie the bail B when seated in throat 5 of the latter and having an extended tip on each side member 15, as indicated at 18, substantially in vertical alignment with the tip 6 on the automatic hook.

This safety hook or safety catch 15—18 normally is maintained in the position shown in Fig. 2 by a coiled spring 19, one end of which is connected with an anchor bolt 20 while the other end of the spring 19 is connected with a cross bar 21 extending between lugs 22 that are secured by welding or otherwise rigidly with the side members 15 of the safety hook. The spring 19 should have somewhat lighter tension than the springs 10 to yield more readily.

The side members 15 are provided at their upper ends with means to withdraw the safety hook or catch either manually or by power. In the form illustrated, this means is shown as including lugs 23 welded or otherwise secured rigidly to the lateral edges of the side members 15 and extending outwardly therefrom. The lugs 23 are held in spaced relation by a bar 24 extending in bridging relation therebetween, as shown in Figs. 4 to 6. A yoke 25 is secured to the bar 24 and forms a means of attachment with the safety hook to release the latter. The bar 24 also serves to limit the swinging movement of the safety hook forward by the tension of the spring 19, abutting against the body 3. These parts may be welded together or otherwise secured so as to function as one unit.

The yoke may be engaged by any suitable means to release the safety catch, either manually or by power. A cable may be attached thereto and extended to a point within convenient reach of the operator for manual actuation, pulling on the cable to disengage the safety catch and permit the bail B to be removed from the automatic hook in the usual manner. However, if desired, power means may be used for this purpose, such as an electric solenoid, hydraulic, air or a vacuum power device.

In the operation of the automatic hook it will be evident that the container will be engaged in the automatic hook and disengaged therefrom substantially as described in the Dempster Patent No. 2,404,830, dated July 30, 1946. As the container C is pulled up the skid bars 2 on the carriage 1, the bail B will push the automatic hook back against the tension of the springs 10 out of the path of the bail B. The bail B will ride over the tip 6 on the automatic hook and over the shuttle member 9 and ribs 7 to an elevated position above the automatic hook in the normal carrying position of the container.

When the operator lowers the container, the bail B also will ride over the ribs 7, pushing the automatic hook back against the tension of the springs 10. The container may be lowered entirely to the ground if desired without engaging the bail with the automatic hook, in which event the container will not be dumped. However, if the operator desires to dump the container, the lowering movement thereof will be stopped when the bail has been lowered just clear of the shuttle member, after which a slight raising movement of the container will lift the shuttle member 9 and allow the bail to pass into the throat 5. With a little experience the operator will be able to detect the proper position of the container for this action and will hear the opening of the shuttle member so that he will know that the bail is engaged with the automatic hook. The movement of the bail B into the throat 5 will cause a backward swinging movement of the safety hook 15 relative thereto about the axis of its pivot 14, but after the bail drops into the throat 5 of the automatic hook the safety hook 15 is moved thereover to its covering position as shown in Fig. 2 under the action of the spring 19. The latter spring is somewhat weaker than the springs 10 so as to yield to this movement of the bail without movement of the automatic hook from its normal position. In other words, the safety locking hook 15 is pushed out of the way, while the automatic hook, held in its outward position by the springs 10, must maintain that position until the forces of the springs 10 are also overcome by the movement of the bail. By having the spring 19 somewhat weaker, the safety hook 15 would naturally push out of the way automatically while the automatic hook is held in engagement and the bail is allowed to fall into the throat of the automatic hook before the safety hook 15 would then spring into position after release therefrom of the bail out of engagement therewith.

After the bail is in the automatic hook as shown in Fig. 2, it will be retained therein securely by the safety hook 15 until the latter is pulled out of its normal position as shown, either manually or by power. When the safety hook is swung forward over the top of the bail as shown in Fig. 2, the clearance between the point of the safety hook and the tip 6 of the automatic hook is less than the diameter of a cross section of the bail which completely precludes the possibility of the bail getting out of the safety hook until the latter is pulled out of engagement or out of its normal position.

It will be evident that the upward movement of the bail for movement of the container into a carrying position is entirely automatic as in the prior Patent No. 2,369,722. In lowering the container the movement is also automatic unless the operator decides to dump the container and put the bail into engagement with the automatic hook raising the shuttle member on the latter. It is only at this point that the safety hook becomes operative and it will move in over the top of the bail, closing over the latter, thus securely locking the bail in position until the safety hook is removed. This is entirely automatic as the safety hook is pushed out of the way by the bail itself, but it remains in automatic holding relation with the bail when the latter is in the throat of the automatic hook until the safety hook is moved either manually or by power out of its holding relation with the bail.

This safety hook prevents the accidental disengagement of the bail from the automatic hook either by shifting of the container on the carriage or by a shifting of the load in the container, or in dumping. Frequently it has been found that a shifting of the load in the container would raise the bail out of the dumping hook, but this is prevented by the automatic safety hook or catch here provided. Furthermore, the bail has been raised out of the automatic hook used heretofore in dumping containers of the tilt-type due to the upward travel of the container on the skid frame, but this also would be prevented by the safety hook of this invention.

The disengagement of the container from the automatic hook is accomplished effectively after first withdrawing the safety hook from its normal position shown in Fig. 2. The bail B slides the shuttle 9 upwardly as the container is raised and then engages the cam surface on the ribs 7 to clear the shuttle 9, allowing the latter to drop back into place over the tip 6. Then upon downward movement of the container the bail rides over these surfaces, clearing the automatic hook and dropping down below the latter.

While the invention has been illustrated and described in one embodiment, it is recognized that variations and changes may be made therein without departing from the invention as set forth in the claims.

I claim:

1. An automatic hook comprising a body having a hook portion thereon, means for pivotally supporting the body about a substantially horizontal axis, movable means for retaining a member in the hook portion, and a safety hook for retaining a member in the hook portion, said safety hook including a member mounted beside the body, means pivotally connecting said member with the body, said member having a hook portion thereon in position to be disposed in overlying opposed relation to the hook portion on the body, yieldable means connected with the member normally tending to hold said member with the hook portion thereof in opposed relation with the body hook portion, and means connected with the member for moving the member laterally out of said normal position.

2. An automatic hook comprising a body having a hook portion thereon for mounting the body for pivotal movement, and a safety hook for retaining a member in the hook portion, said safety hook including a pair of side members in embracing relation with the body, means pivotally supporting the side members on the body below the hook portion for swinging movement relative thereto, said side members having hook portions in positions to overlie the hook portion on the body to confine a member therein, and means connected with the members yieldably tending to hold said members in said opposed relation.

3. An automatic hook comprising a body having a hook portion thereon for mounting the body for pivotal movement, a safety hook for retaining a member in the hook portion, said safety hook including a pair of side members in embracing relation with the body, means pivotally supporting the side members on the body below the hook portion for swinging movement relative thereto, said side members having hook portions in positions to overlie the hook portion on the body to confine a member therein, means connected with the members yieldably tending to hold said members in said opposed relation, and a yoke connected with the members at points spaced from the connection of the yieldable means therewith for moving the members out of said normal position.

4. An automatic hook comprising an elongated body having a hook portion on one end thereof, means pivotally supporting the body at the opposite end thereof, movable means for retaining a member in the hook portion, and a safety hook for retaining a member in the hook portion of the body, said safety hook including elongated side members arranged in embracing relation with the body, means pivotally mounting the side members at one end on the body adjacent the hook portion, said side members having hook portions thereon at the opposite end arranged in overlying relation with the hook portion on the body, yieldable means connected with the side members normally tending to hold the hook portions thereof in said opposed relation with the hook portion on the body, and means connected with said members for withdrawing the same out of said normal positions.

5. An automatic hook comprising an elongated body having a hook portion on one end thereof, means at the opposite end thereof for pivotally supporting said body, and a safety hook for retaining a member in the hook portion of the body, said safety hook including a pair of side members arranged in embracing relation with the body and elongated lengthwise thereof, a pin pivotally mounting the members at one end thereof on the body at an end of the body adjacent the hook portion, each of said side members having a hook portion thereon arranged at the opposite side of the hook portion of the body from said pin and overlying the hook portion on the body in opposed relation therewith to retain a member in said hook portion, a lug connected with the side members and extending laterally therefrom, a coiled spring connected with the lug at one end, and an anchoring bolt connected with the opposite end of the spring and with the body normally tending to tension the spring to hold the side members in normal positions with the hook portions thereof overlying the hook portion on the body.

6. An automatic hook comprising an elongated body having a hook portion on one end thereof, means at the opposite end thereof for pivotally supporting said body, and a safety hook for retaining a member in the hook portion of the body, said safety hook including a pair of side members arranged in embracing relation with the body and elongated lengthwise thereof, a pin pivotally mounting the members at one end thereof on the body at an end of the body adjacent the hook portion, each of said side members having a hook portion thereon arranged at the opposite side of the hook portion of the body from said pin and overlying the hook portion on the body in opposed relation therewith to retain a member in said hook portion, a lug connected with the side members and extending laterally therefrom, a coiled spring connected with the lug at one end, an anchoring bolt connected with the opposite end of the spring and with the body normally tending to tension the spring to hold the side members in normal positions with the hook portions thereof overlying the hook portion on the body, lugs secured on the side members at the opposite end thereof from the pin and extending outwardly therefrom, a bar secured in bridging relation between the last-mentioned lugs and arranged to form an abutment against a side of the body to limit swinging movement of the safety hook in one direction relative thereto, and a yoke secured to the bar for moving the side members in the opposite direction out of said normal position.

7. An automatic hook comprising an upright elongated body having a hook portion thereon adapted to receive a member therein, means for pivotally supporting the body about a transverse axis at a point above the hook portion, a shuttle movably mounted on the body in opposed relation to the hook portion for deflecting the member from the hook portion upon downward movement of the member relative thereto, and a safety hook separate from the shuttle and movably mounted on the body with a hook portion normally overlying the hook portion on the body for retaining the member therein.

8. An automatic hook comprising an upright elongated body having a hook portion thereon adapted to receive a member therein, means for pivotally supporting the body about a transverse axis at a point above the hook portion, a shuttle movably mounted on the body in opposed relation to the hook portion for deflecting the member from the hook portion upon downward movement of the member relative thereto, a safety hook separate from the shuttle and movably mounted on the body with a hook portion normally overlying the hook portion on the body for retaining the member therein, and means pivotally mounting the safety hook on the body below the hook portion thereof for swinging movement relative thereto.

9. An automatic hook comprising an upright elongated body having a hook portion thereon adapted to receive a member therein, means for pivotally supporting the body about a transverse axis at a point above the hook portion, a shuttle movably mounted on the body in opposed relation to the hook portion for deflecting the member from the hook portion upon downward movement of the member relative thereto, a safety hook separate from the shuttle and movably mounted on the body with a hook portion normally overlying the hook portion on the body for retaining the member therein, means pivotally mounting the safety hook on the body below the hook portion thereof for swinging movement relative thereto, means yieldably urging the safety hook into overlying relation over the hook portion on the body, and means for withdrawing the safety hook from said normal position for removal of the member.

10. An automatic hook comprising an upright elongated body having a hook portion thereon adapted to receive a member therein, means for pivotally supporting the body about a transverse axis at a point above the hook portion, a shuttle movably mounted on the body in opposed relation to the hook portion for deflecting the member from the hook portion upon downward movement of the member relative thereto, and a safety hook separate from the shuttle and movably mounted on the body with a hook portion normally overlying the hook portion on the body for retaining the member therein, yieldable means acting on the safety hook urging the hook portion thereof over the first-mentioned hook portion, said hook portion on the safety hook being in the path of the member upon movement of the member and movable yieldably thereby to permit movement of the member into the first-mentioned hook portion.

11. An automatic hook comprising an upright elongated body having a hook portion thereon and projecting laterally from the body, a shuttle mounted on the body for movement toward and from the hook portion, said shuttle having an abutment portion projecting laterally from the body overlapping the hook portion and outwardly beyond the end of the hook portion in position for engagement by a member moving upward over the hook to lift the shuttle thereby and enter the hook, a safety hook separate from the shuttle and movably mounted on the body beside the shuttle, said safety hook having a hook portion overlapping the hook portion on the body for retaining said member in the first-mentioned hook portion, and means for limiting the outermost position of the second-mentioned hook portion to a point between the body portion and an upright plane at the outer edge of the first-mentioned hook portion.

12. An automatic hook comprising an upright elongated body having a hook portion thereon and projecting laterally from the body, a shuttle mounted on the body for movement toward and from the hook portion, said shuttle having an abutment portion projecting laterally from the body overlapping the hook portion and outwardly beyond the end of the hook portion in position for engagement by a member moving upward over the hook to lift the shuttle thereby and enter the hook, a safety hook separate from the shuttle and movably mounted on the body beside the shuttle, said safety hook having a hook portion overlapping the hook portion on the body for retaining said member in the first-mentioned hook portion, means for limiting the outermost position of the second-mentioned hook portion to a point between the body portion and an upright plane at the outer edge of the first-mentioned hook portion, and means yieldably urging the safety hook toward the last-mentioned position for retaining the member in the first-mentioned hook portion with the shuttle thereover.

References Cited in the file of this patent

UNITED STATES PATENTS

| | | |
|---|---|---|
| 1,457,648 | Bailey | June 5, 1923 |
| 1,576,197 | Kuffel et al. | Mar. 9, 1926 |
| 2,009,938 | Manbeck | July 30, 1935 |
| 2,091,093 | Buccicone et al. | Aug. 24, 1937 |
| 2,404,830 | Dempster | July 30, 1946 |
| 2,445,106 | Dempster | July 13, 1948 |
| 2,582,990 | Hattan | Jan. 22, 1952 |
| 2,644,407 | McCormick | July 7, 1953 |